Nov. 25, 1947.  A. E. ROUT  2,431,585
NITRATION OF AROMATIC HYDROCARBONS
Filed July 18, 1945
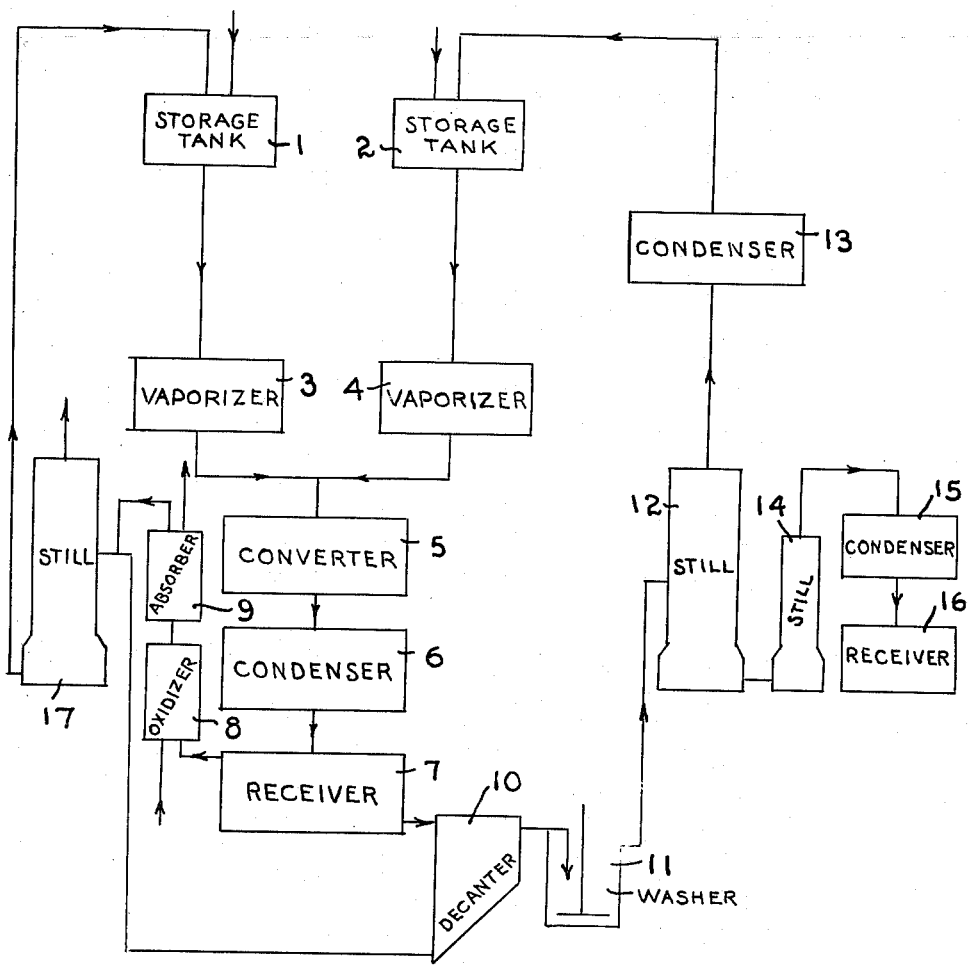
INVENTOR.
Alfred Edgar Rout
BY
ATTORNEY.

Patented Nov. 25, 1947

2,431,585

UNITED STATES PATENT OFFICE 2,431,585

NITRATION OF AROMATIC HYDROCARBONS

Alfred Edgar Rout, Norton-on-Tees, England, assignor to Imperial Chemical Industries Limited, a corporation of Great Britain Application July 18, 1945, Serial No. 605,723
In Great Britain June 29, 1944

14 Claims. (Cl. 260—645)

This invention relates to the production of mono-nitro derivatives of aromatic hydrocarbons and their substitution products, such as the mono-nitro derivatives of benzene, alkyl benzenes and their substitution products, particularly mono-nitrobenzene.

It has been customary to produce these substances by the treatment of the corresponding hydrocarbon or substituted hydrocarbon with a mixture of concentrated nitric and sulphuric acids in the liquid phase, with the aid of heat or by cooling if necessary. This procedure however, suffers from several disadvantages, chief among which may be mentioned: the need for heavy and therefore expensive apparatus; the use of a batch in contrast to a continuous process; the slowness of the reaction necessitating the use of a large unit for a given output; the necessity for recovering sulphuric acid from the spent acid if the process is to be economic; the necessity for very close control of the reaction temperature and rate of addition of mixed nitrating acid; and the tendency with some of the alkyl benzenes to the formation of the di- and tri-nitro derivatives. To meet these disadvantages it has been proposed to carry out the nitration in the vapour phase using a silica gel catalyst and no sulphuric acid. The chief advantages of catalytic vapour phase nitration, if it could be operated efficiently, are that it would make possible the use of a continuous process; that smaller plant would be required for a given output since quicker reaction rates would be possible; that the low concentrations of reactants in the reaction zone and the use of vapours instead of liquids would minimize the difficulties associated with the exothermic nature of the reaction; and that no sulphuric acid would be required. The present invention relates to a process of vapour phase nitration.

According to the present invention there is provided a process for the production of the mono-nitro derivatives of aromatic hydrocarbons or their substitution products, particularly the mono-nitro derivatives of benzene, alkyl benzenes, and their substitution products, which comprises nitrating the corresponding hydrocarbon or a substitution product thereof, in the vapour phase using nitric acid or nitrogen dioxide and a catalyst selected from the group; metal metaphosphates, boron phosphate, solid and supported phosphoric acid catalysts. Preferably the hydrocarbon is one which can be readily vaporized. In general, these catalysts give increased yields over those obtained by the use of known catalysts under the same reaction conditions. Nitrogen dioxide, when used, is preferably in a pure or relatively pure form, but it may also be produced in situ, for example, by using nitric oxide and oxygen, nitrogen trioxide and oxygen, or nitrogen pentoxide.

Examples of effective catalysts are calcium, iron (ferric), magnesium, cadmium, nickel and ferroso-ferric metaphosphates. Other catalysts which may be used, but with less effect, are strontium, copper and potassium metaphosphates and boron phosphate. Calcium, iron and magnesium metaphosphates have the merit that they give suitable reaction rates at 130–150° C., temperatures at which the oxidation of benzene is reduced to about 0.5% and formation of nitric oxide and nitrogen by undesirable side reactions is reduced considerably. This is of considerable importance because when using nitric acid as nitrating agent it was necessary in the prior art in order to avoid high nitric acid losses, to operate at temperatures which gave very low pass conversions. Suitable reaction conditions are a temperature of 130–430° C. (although conversions at temperatures as low as 100° C. have been obtained), and atmospheric pressure, although higher pressures may also sometimes be used with advantage. An advantage connected with the use of certain of our more active catalysts in the lower temperature ranges is that the formation of nitric oxide can be reduced to negligible proportions and its recovery rendered unnecessary.

The catalysts may be prepared by dissolving the metal oxides, hydroxides, oxalates or carbonates, and sometimes the metals themselves, in sufficient orthophosphoric acid to give the metaphosphate, evaporating to dryness, and drying the solid catalyst at 250–400° C. the actual temperature used depending on the specific metaphosphate being prepared and on the reaction temperature. The catalyst in its preferred form comprises granules grading between ⅛″ and ⅜″ and is sieved free of dust. These granules may conveniently be formed by pelleting.

Examples of compounds that can be produced according to the process of the invention are mono-nitrobenzene, mono-nitrotoluene, mono-nitroxylene and mono-nitroethylbenzene.

The process will now be described as applied to the production of mono-nitrobenzene. The ratio of the reactants is preferably between one and three molecules of benzene to one molecule of nitric acid. Nitric acid of various concentrations may be used and it may be, for example, constant boiling nitric acid containing 68% HNO₃. The use of a low molecular ratio of benzene to nitric acid gives better conversion of benzene and reduces the amount of nitrogen formed by side reactions, but reduces the percentage conversion of nitric acid. On the other hand, a high molecular ratio of benzene increases the conversion of nitric acid, a feature which is an advantage when the process is operated continuously, because the recycling of nitric acid is more troublesome than that of benzene owing to the need for concentrating it. Preferably the working conditions are chosen so that the reduction of nitric acid or nitrogen dioxide to nitrogen is not more than about 1%.

Using constant boiling nitric acid as the nitrating agent, the invention may be carried out in a continuous manner by dripping nitric acid and benzene separately into two vaporisers, each comprising, for example, a vessel packed with an inert material and heated by a steam jacket or by an electric heater; passing the vapours so formed through the catalyst, contained in a converter made of material which is non-catalytic as regards side reactions, e. g., stainless steel or glass, and maintained at a temperature of 130–430° C. and at atmospheric pressure; passing the reaction products from the converter to a condenser; collecting the condensate in a catchpot; removing the nitric oxide formed as a product of the reaction, oxidising it to nitric acid by means of air or oxygen or by other known methods, concentrating the nitric acid to the constant boiling mixture, and recycling to the feed tank or to the vaporiser; separating the nitrobenzene-benzene mixture from the aqueous nitric acid and passing the latter to the nitric acid concentrator; separating the nitrobenzene from the benzene by distillation and recycling the latter to the feed tank or the vaporiser, and controlling the composition of the reaction mixture in the reaction zone by continuously introducing benzene and nitric acid of an appropriate concentration. The nitrobenzene is preferably washed with aqueous alkali before stripping off the benzene. The make-up nitric acid may be of a higher concentration than the constant boiling mixture recycled, and may conveniently be introduced into the feed tank. In this process the separation of the benzene from the nitrobenzene may with advantage be carried out using two condensers in series. Substantially all the nitrobenzene is condensed from the vapour in the first of these and the benzene likewise in the second. The layers of the dilute nitric acid in each condenser are separated and concentrated as already described.

If nitrogen dioxide were used as nitrating agent the process would be controlled so that substantially all of it was converted to nitrobenzene and nitric oxide.

One form of apparatus suitable for operation of the process in continuous manner is shown schematically in the diagram. 1 and 2 are storage tanks for nitric acid and benzene respectively connected by pipe lines to separate vaporisers 3 and 4; 5 is the converter, constructed of stainless steel and provided with a glass liner and connected to a condenser 6. The condensate comprising aqueous nitric acid and an oily layer collects in the receiver 7, while the gaseous products are passed to the oxidiser 8, in which the nitric oxide is oxidised to nitrogen dioxide by means of oxygen, and then to the absorber 9 in which the nitrogen dioxide is absorbed in water and from which the remaining gaseous products are purged. The condensate in 7 is passed to the decanter 10 and there separated into an oily layer, comprising a mixture of benzene and nitrobenzene, which is passed to a benzene stripping still 12, and a layer of aqueous nitric acid. The mixture of benzene and nitrobenzene may be washed with aqueous alkali in the vessel 11 if desired. The aqueous nitric acid and that from the absorber 9 are passed to the still 17 for concentrating the nitric acid to constant boiling strength. Still 12 is provided with a condenser 13. The nitrobenzene is purified by redistillation in still 14 connected to condenser 15 and receiver 16.

The invention is illustrated but not limited by the following example.

*Example*

Benzene was passed at a rate of 200 mls./hour into a glass vaporiser packed with fragments of glass tubing and heated by means of a tubular electric furnace, and 98% nitric acid with a specific gravity of 1.51 at 15° C. was passed into a similar vaporiser at a rate of 35 mls./hour, conditions in both vaporisers being arranged so that the liquid was completely vaporised. The two streams of vapour were passed into a mixing T and the mixed vapours were then passed into a glass converter of 1 litre volume filled with ¼–⅛" granules of calcium metaphosphate and heated by means of an electric furnace controlled so that a thermocouple situated in a tube embedded in the catalyst, and running its whole length, registered a maximum temperature of 175° C.

The vapours from the converter were condensed and the condensate was collected as two layers in a receiver. The benzene and nitrobenzene in the oily layer were separated by distillation.

In a typical run of one hour's duration 74 gms. of nitrobenzene, corresponding to a 27% conversion of benzene, was obtained.

I claim:

1. A process for the production of mono-nitrobenzene which comprises nitrating benzene in the vapour phase using nitric acid in a molar ratio relative to benzene of from 1:3 to 1:1 and a catalyst selected from the group consisting of metal metaphosphates and boron phosphate.

2. A process for the production of mononitro derivatives which comprises nitrating a compound selected from the group consisting of benzene, toluene, xylenes and ethylbenzene in the vapor phase using a nitrating agent selected from the group consisting of nitric acid and nitrogen dioxide and a catalyst selected from the group consisting of metal metaphosphates and boron phosphate.

3. A process for the production of mononitrobenzene which comprises nitrating benzene in the vapor phase using a nitrating agent selected from the group consisting of nitric acid and nitrogen dioxide and a catalyst selected from the group consisting of metal metaphosphates and boron phosphate.

4. A process for the production of mononitrotoluene which comprises nitrating toluene in the vapor phase using a nitrating agent selected from the group consisting of nitric acid and nitrogen dioxide and a catalyst selected from the group consisting of metal metaphosphates and boron phosphate.

5. A process for the production of mononitroxylenes which comprises nitrating a xylene in the vapor phase using a nitrating agent selected from the group consisting of nitric acid and nitrogen dioxide and a catalyst selected from the group consisting of metal metaphosphates and boron phosphate.

6. A process for the production of mononitro derivatives which comprises nitrating a compound selected from the group consisting of benzene, toluene, xylenes and ethylbenzene in the vapor phase using a nitrating agent selected from the group consisting of nitric acid and nitrogen dioxide and a catalyst consisting of calcium metaphosphate.

7. A process for the production of mononitro derivatives which comprises nitrating a compound selected from the group consisting of benzene, toluene, xylenes and ethylbenzene in the vapor phase using a nitrating agent selected from the group consisting of nitric acid and nitrogen dioxide and a catalyst consisting of iron metaphosphate.

8. A process for the production of mononitro derivatives which comprises nitrating a compound selected from the group consisting of benzene, toluene, xylenes and ethylbenzene in the vapor phase using a nitrating agent selected from the group consisting of nitric acid and nitrogen dioxide and a catalyst consisting of magnesium metaphosphate.

9. A process for the production of mononitro derivatives which comprises nitrating a compound selected from the group consisting of benzene, toluene, xylenes and ethylbenzene in the vapor phase at 130° to 430° C. using a nitrating agent selected from the group consisting of nitric acid and nitrogen dioxide and a catalyst selected from the group consisting of metal metaphosphates and boron phosphate.

10. A process for the production of mononitro derivatives which comprises nitrating a compound selected from the group consisting of benzene, toluene, xylenes and ethylbenzene in the vapor phase under pressure using a nitrating agent selected from the group consisting of nitric acid and nitrogen dioxide and a catalyst selected from the group consisting of metal metaphosphates and boron phosphate.

11. A process for the production of mononitro derivatives which comprises vaporizing nitric acid and a compound selected from the group consisting of benzene, toluene, xylenes and ethylbenzene, passing the vapors mixed in predetermined proportions through a catalyst selected from the group consisting of metal metaphosphates and boron phosphate contained in a converter which is maintained at an elevated temperature, condensing the readily condensable products, separating the nitro hydrocarbon/hydrocarbon layer in the condensate from the aqueous layer, and separating the mono-nitro hydrocarbon from the hydrocarbon by distillation.

12. A process for the production of mono-nitro derivatives which comprises separately vaporizing nitric acid and a compound selected from the group consisting of benzene, toluene, xylenes, and ethylbenzene, mixing the vapors in predetermined proportions and passing them through a catalyst selected from the group consisting of metal metaphosphates and boron phosphate, contained in a converter which is maintained at an elevated temperature, condensing the products, oxidizing the nitric oxide obtained as a by-product of the reaction to nitrogen dioxide, absorbing this nitrogen dioxide in water and reusing the nitric acid so formed.

13. A process for the production of mono-nitro derivatives which comprises separately vaporizing constant boiling nitric acid and a compound selected from the group consisting of benzene, toluene, xylenes and ethylbenzene, passing the vapors in predetermined proportions through a catalyst selected from the group consisting of metal metaphosphates and boron phosphate contained in a converter which is maintained at a selected elevated temperature, condensing the readily condensable products, oxidizing the nitric oxide obtained as a by-product of the reaction to nitrogen dioxide, absorbing the nitrogen dioxide in water to form nitric acid, mixing the nitric acid so obtained with that obtained from the condensate, concentrating the mixture to constant boiling composition and reusing the acid so formed.

14. A continuous process for the production of mono-nitro derivatives using constant boiling nitric acid as nitrating agent which comprises continuously introducing constant boiling nitric acid and a compound selected from the group consisting of benzene, toluene, xylenes, and ethylbenzene, respectively into two separate vaporizers, continuously mixing the vapors in predetermined relative proportions and passing them through a catalyst selected from the group consisting of metal metaphosphates and boron phosphate, contained in a converter which is maintained at 130° to 430° C. and at atmospheric pressure, continuously passing the reaction products to a condenser and collecting the condensate, continuously removing the nitric oxide formed as a by-product of the reaction, oxidizing it to nitrogen dioxide and absorbing the nitrogen dioxide in water, continuously separating the mono-nitro hydrocarbon/hydrocarbon layer of condensate from the aqueous nitric acid layer, continuously mixing the aqueous nitric acid with that obtained by oxidation of the nitric oxide, concentrating the mixture to constant boiling composition, recycling to the nitric acid vaporizer, continuously separating the mono-nitro hydrocarbon from the hydrocarbon by distillation and recycling the latter to the hydrocarbon vaporizer, and continuously regulating the composition of the reaction mixture by controlling the addition of hydrocarbon and nitric acid of appropriate composition.

ALFRED EDGAR ROUT.

REFERENCES CITED

The following references are of record in the file of this patent:

UNITED STATES PATENTS

| Number | Name | Date |
|---|---|---|
| 1,872,700 | Dreyfus | Aug. 23, 1932 |
| 2,109,873 | Wilhelm | Mar. 1, 1938 |

FOREIGN PATENTS

| Number | Country | Date |
|---|---|---|
| 192,363 | Switzerland | Oct. 16, 1937 |
| 821,767 | France | Dec. 13, 1937 |

OTHER REFERENCES

McKee et al., "Ind. Eng. Chem.," vol. 28, (1936), pages 662 to 667.